US006905160B2

(12) United States Patent
Yoshida et al.

(10) Patent No.: US 6,905,160 B2
(45) Date of Patent: Jun. 14, 2005

(54) WINDSCREEN MOUNTING STRUCTURE FOR A MOTORCYCLE

(75) Inventors: Naoki Yoshida, Saitama (JP); Yasuhiro Uchiike, Saitama (JP); Mitsuya Kawamura, Saitama (JP); Hiroyuki Kido, Saitama (JP); Katsumi Kanai, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/646,690

(22) Filed: Aug. 25, 2003

(65) Prior Publication Data

US 2004/0061350 A1 Apr. 1, 2004

(30) Foreign Application Priority Data

Sep. 10, 2002 (JP) ......................................... 2002-263806

(51) Int. Cl.[7] ................................................ B62J 23/00
(52) U.S. Cl. ...................................................... 296/78.1
(58) Field of Search ........................................ 296/78.1

(56) References Cited

U.S. PATENT DOCUMENTS

| 4,514,006 A | * | 4/1985 | Maruoka | ................... 296/78.1 |
| 4,696,509 A | * | 9/1987 | Yagasaki et al. | ......... 296/96.21 |
| 4,830,423 A | * | 5/1989 | Nebu et al. | ................ 296/78.1 |
| 5,853,217 A | * | 12/1998 | Armstrong | ................. 296/78.1 |

FOREIGN PATENT DOCUMENTS

| IT | 528604 | * 6/1955 | ................ 296/78.1 |
| JP | 3-103894 U | 10/1991 | |

OTHER PUBLICATIONS

Vetter Fairing Co., Windjammer SS, copyright May 1, 1977, web site: Http://www.crc2onlinecatalog.com/windsh_tour.htm.*

* cited by examiner

*Primary Examiner*—Dennis H. Pedder
(74) *Attorney, Agent, or Firm*—Birch, Stewart, Kolasch & Birch, LLP

(57) ABSTRACT

A motorcycle having a front cowl provided at a front of the vehicle body is provided with a windscreen attached thereto. The front cowl is curved so as to project toward the front of the vehicle body and is mounted in a posture so as to extend toward the rear. A mounting plane inclined upward toward the rear is formed on the front surface of the front cowl, and the windscreen extends upwardly from the front cowl and is secured to the mounting plane with bolts so as to be capable of adjustment in the vertical direction. The aforementioned structure permits the mounting of the windscreen to the front cowl so as to be capable of adjustment in the vertical direction and to achieve a desirable windproofing effect. This structure enables the upper end of the windscreen to be moved linearly in the vertical direction and in the fore-and-aft direction.

9 Claims, 16 Drawing Sheets

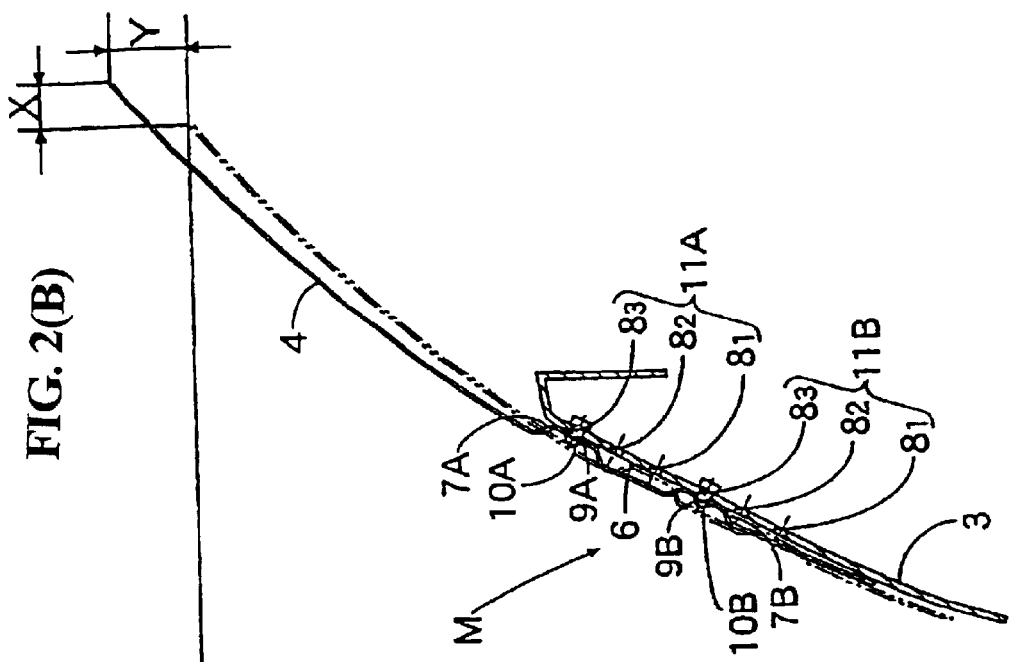
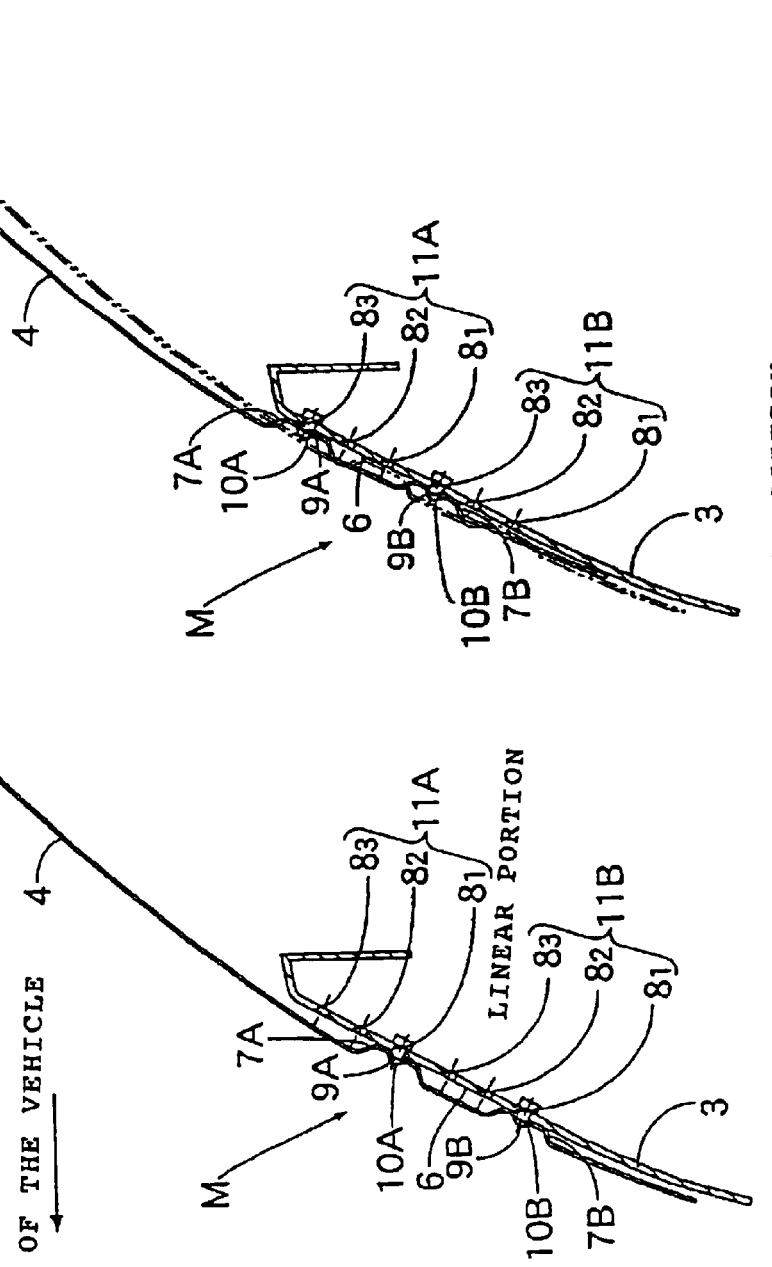

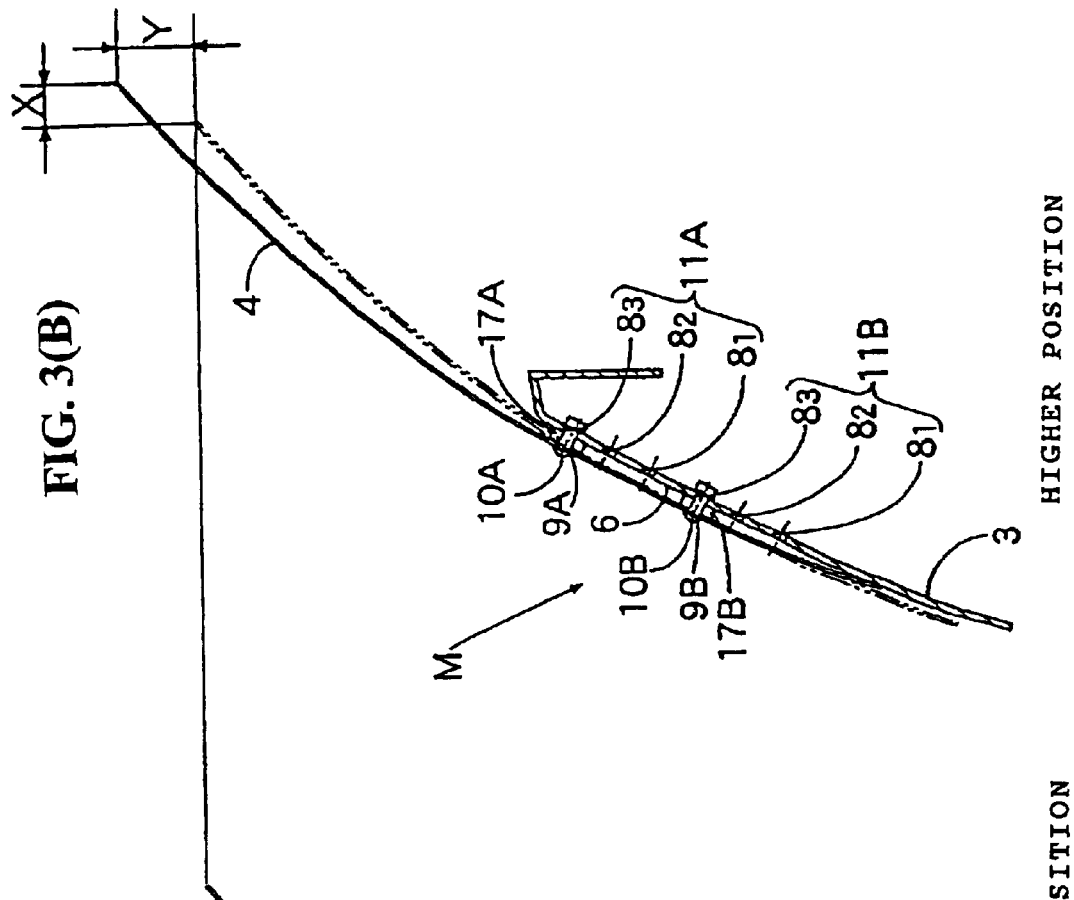
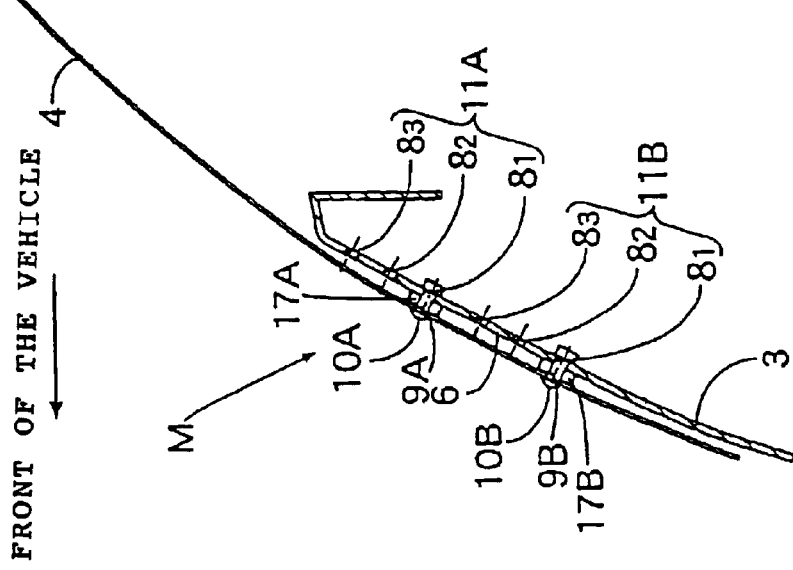

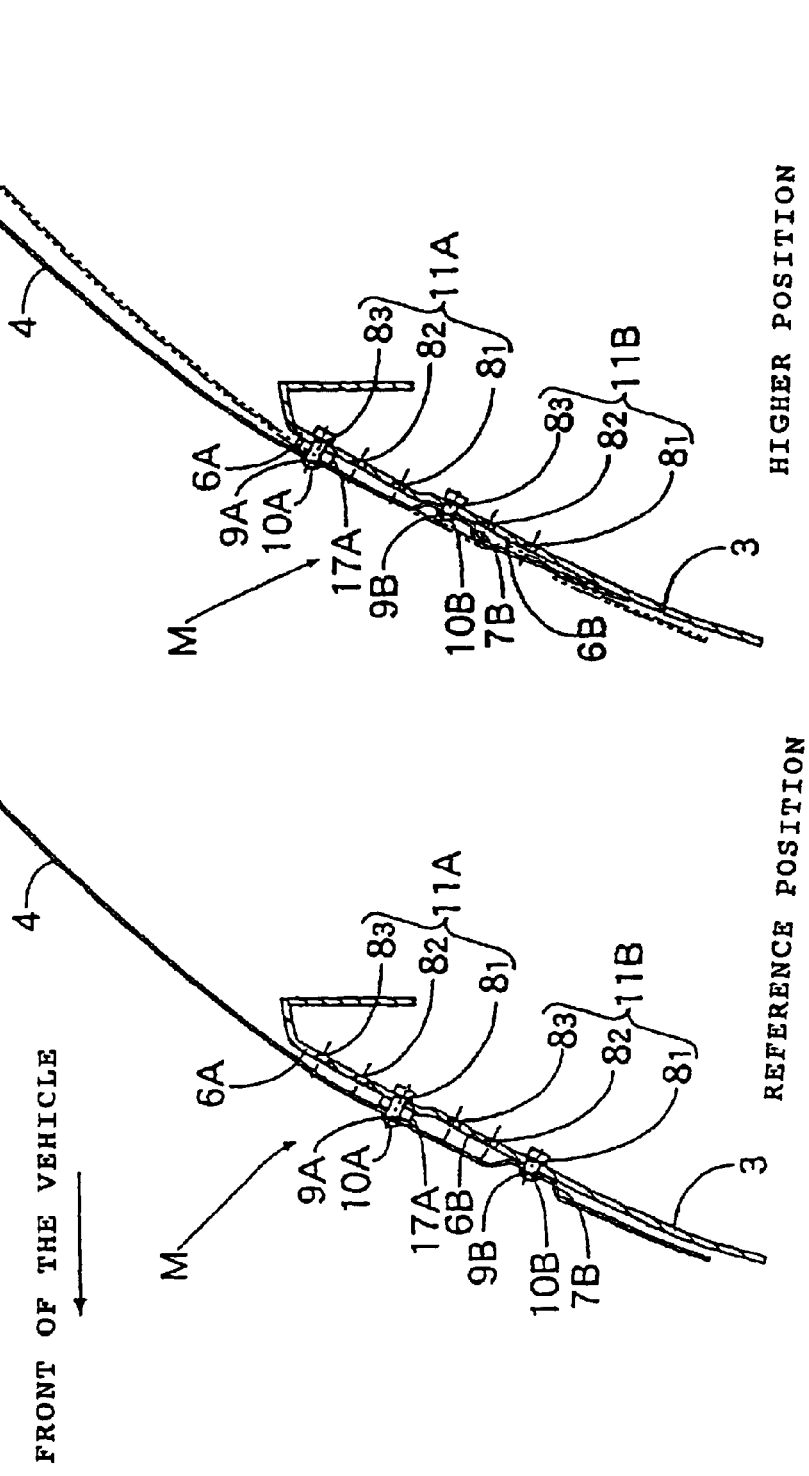

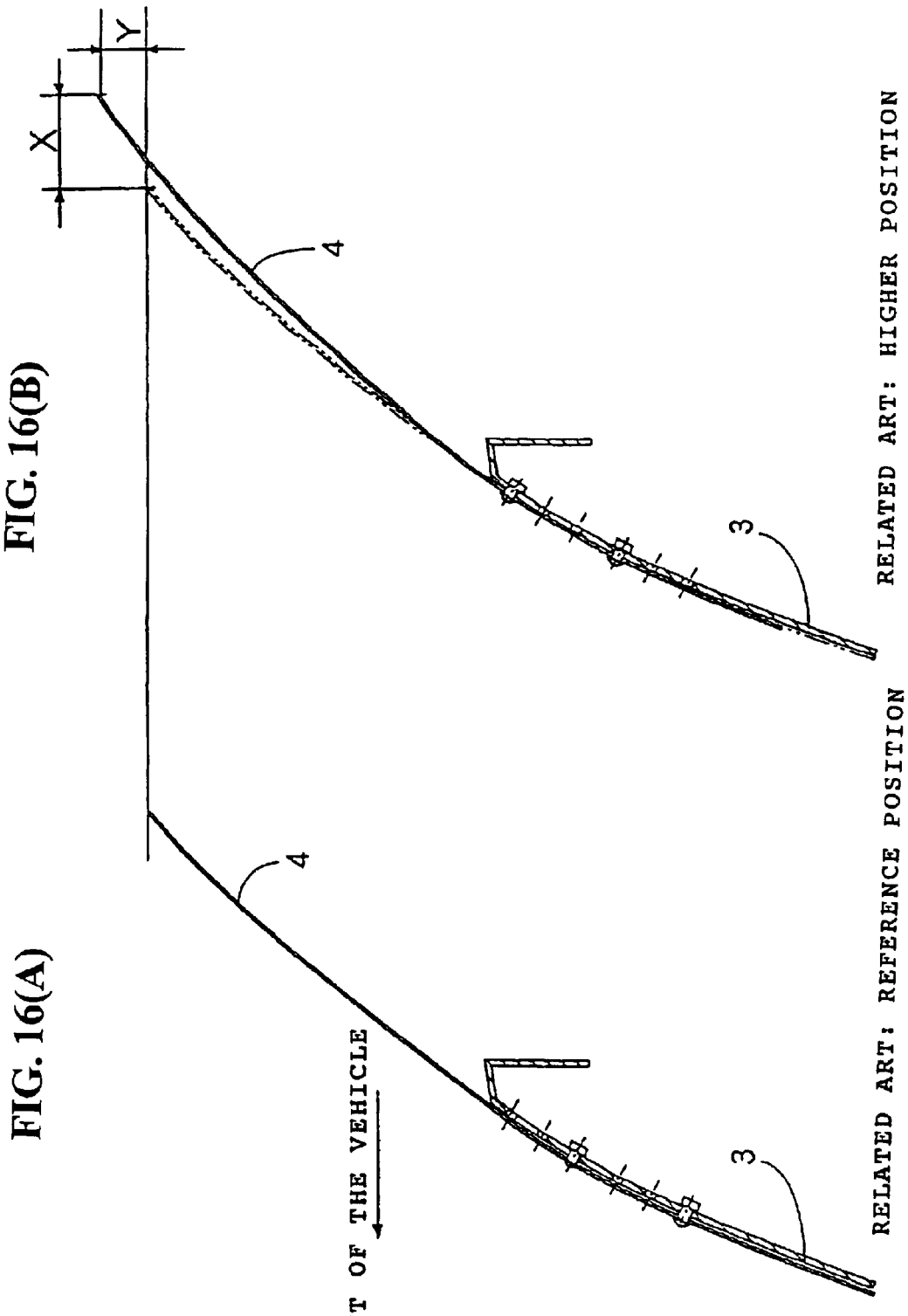

WINDSCREEN MOUNTING STRUCTURE FOR A MOTORCYCLE

CROSS-REFERENCES TO RELATED APPLICATIONS

This nonprovisional application claims priority under 35 U.S.C. § 119(a) on patent application Ser. No. 2002-263806 filed in Japan on Sep. 10, 2002, the entirety of which is herein incorporated by reference.

BACKGROUND OF THE INVENTION

1. Field of the Invention

The present invention relates to a motorcycle having a front cowl curved so as to project toward the front of the vehicle body and mounted at the front of the vehicle body in a posture so as to rise toward the rear of the vehicle body. More particularly, the present invention relates to a windscreen mounting structure for a motorcycle in which the windscreen extends upwardly from the front cowl and is attached on the front surface of the front cowl so as to be capable of adjustment with respect to a vertical direction.

2. Description of the Background Art

In the related art, a windscreen mounting structure for a motorcycle in which a windscreen is disposed forward of a steering handle is adjustably mounted to a vehicle body via a link mechanism. Accordingly, the vertical positioning and adjustment of the angle of a windscreen has been described in the related art, e.g., for example Japanese Patent Document, JP-UM-A-3-103894.

In the structure described above, although the vertical position or the angle of the windscreen can be freely adjusted depending on the physical constitution of the rider of the motorcycle. However, this structure is likely to increase costs since a relatively complex link mechanism is required to ease the efforts required by the rider to make adjustments.

In order to simplify the structure and reduce the costs, an alternative approach has been utilized in the related art as shown in FIG. 16. As seen in FIG. 16, a windscreen mounting structure for a motorcycle includes a front cowl 3 disposed at the front of the motorcycle so as to raise toward the rear and serve as a mounting base. A windscreen 4 is then attached thereto with bolts so as to be adjustable in the vertical direction.

The present inventors have determined that in such a structure, the front cowl 3 and the windscreen 4 are generally curved so as to project toward the front. Therefore, when the mounting position of the windscreen 4 with respect to the front cowl 3 is moved upward in order to move the level of the windscreen 4 from a state shown in FIG. 16(A) to a state shown in FIG. 16(B), the shift amount X of the upper end of the windscreen 4 toward the rider is relatively large compared to the upward shift amount Y thereof. Since the angle of reflection of wind on the windscreen 4 is reduced, it is difficult to achieve a preferable windproof effect.

SUMMARY OF THE INVENTION

The present invention overcomes the shortcomings associated with the background art and achieves other advantages not realized by the background art.

An object of the present invention is to provide a simple and low-cost windscreen mounting structure for a motorcycle in which the upper end of the windscreen can be linearly shifted with respect to a vertical direction and a fore-and-aft direction.

An additional object of the present invention is to provide a windscreen mounting structure obtaining a preferable windproof effect despite having the windscreen attached to the front cowl and capable of vertical adjustment.

One or more of these and other objects are accomplished by a motorcycle comprising a vehicle body having a front side and a rear side, and a front cowl at the front side of the vehicle body, wherein the front cowl is curved so as to project toward the front side and is mounted in a position extending toward the rear side of the vehicle body; a pair of mounting plates formed on a front surface of the front cowl, the mounting planes being inclined upward and toward the rear side of the vehicle body; and a windscreen extending upwardly from the front cowl and being secured to each of the mounting planes with a bolt so as to be capable of adjustment with respect to a vertical direction of the vehicle body.

One or more of these and other objects are further accomplished by a windscreen mounting structure for a motorcycle, the windscreen mounting structure comprising a front cowl for mounting at a front side of a vehicle body, wherein the front cowl is curved so as to project toward a front side of the cowl and extends toward a rear side of the cowl; a pair of mounting planes formed on a front surface of the front cowl, the mounting planes being inclined upward and extending toward a rear side of the front cowl; and a windscreen extending upwardly from the front cowl and being secured to each of the mounting planes with a bolt so as to be capable of adjustment with respect to a vertical direction of the front cowl and the windscreen.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 2(A) is a vertical cross-sectional side view of the windscreen mounting structure showing the height of the windscreen set to a reference position;

FIG. 2(B) is a vertical cross-sectional view of the windscreen mounting structure showing the height of the windscreen set to a higher position than the reference position;

FIGS. 3(A) and 3(B) are vertical cross-sectional views corresponding to FIGS. 2(A) and 2(B), respectively, and showing a second embodiment of the present invention;

FIGS. 4(A) and 4(B) are vertical cross-sectional views corresponding to FIGS. 2(A) and 2(B), respectively, and showing a third embodiment of the present invention;

FIG. 16(A) is a vertical cross-sectional side view of the windscreen mounting structure of the related art showing the height of the windscreen set to a reference position; and FIG. 16(B) is a vertical cross-sectional view of the windscreen mounting structure of the related art showing the height of the windscreen set to a higher position than the reference position.

DETAILED DESCRIPTION OF THE PREFERRED EMBODIMENTS

Figure 1:
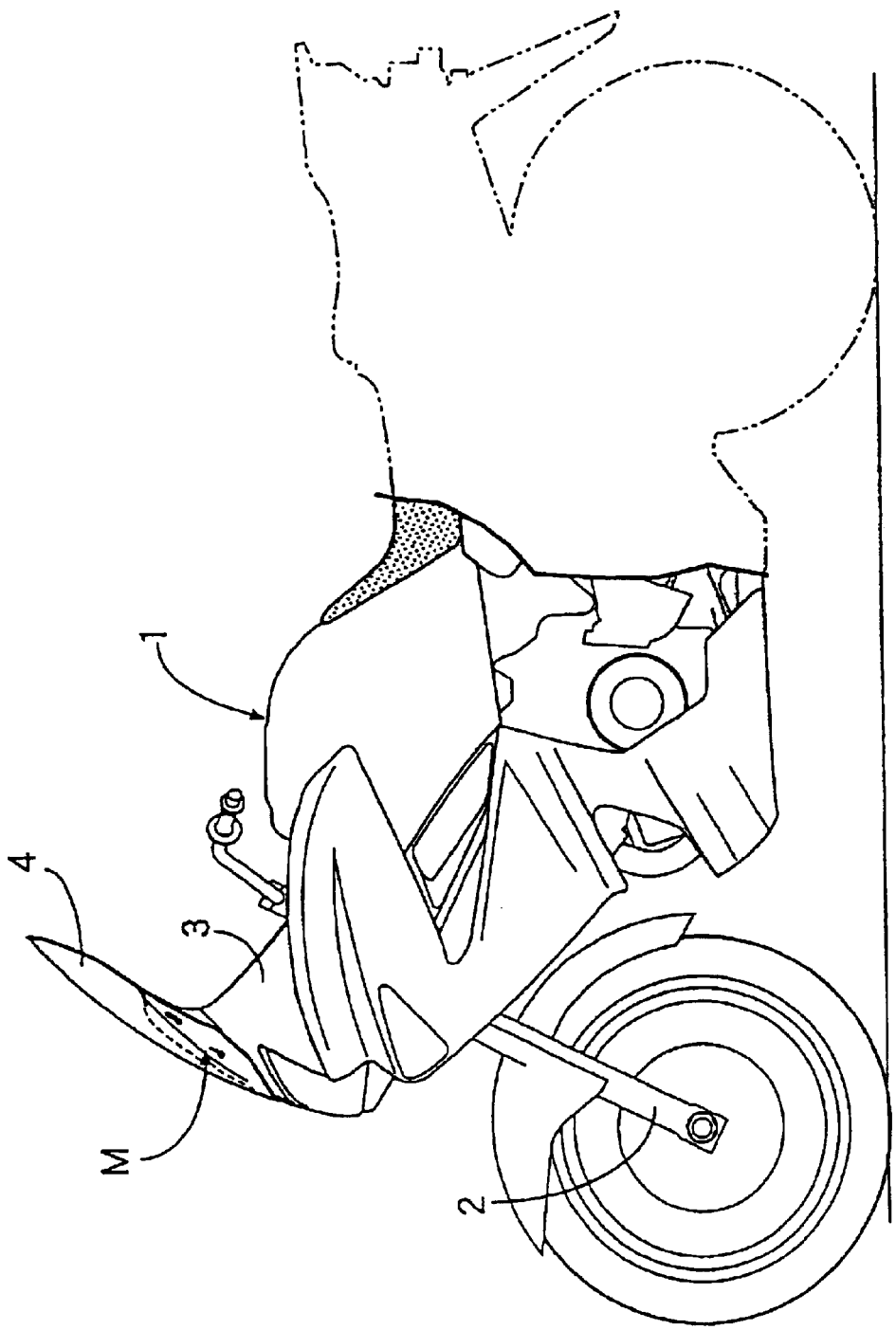
FIG. 1 is a side view of a motorcycle provided with a windscreen mounting structure according to a first embodiment of the present invention.
Figure 5:
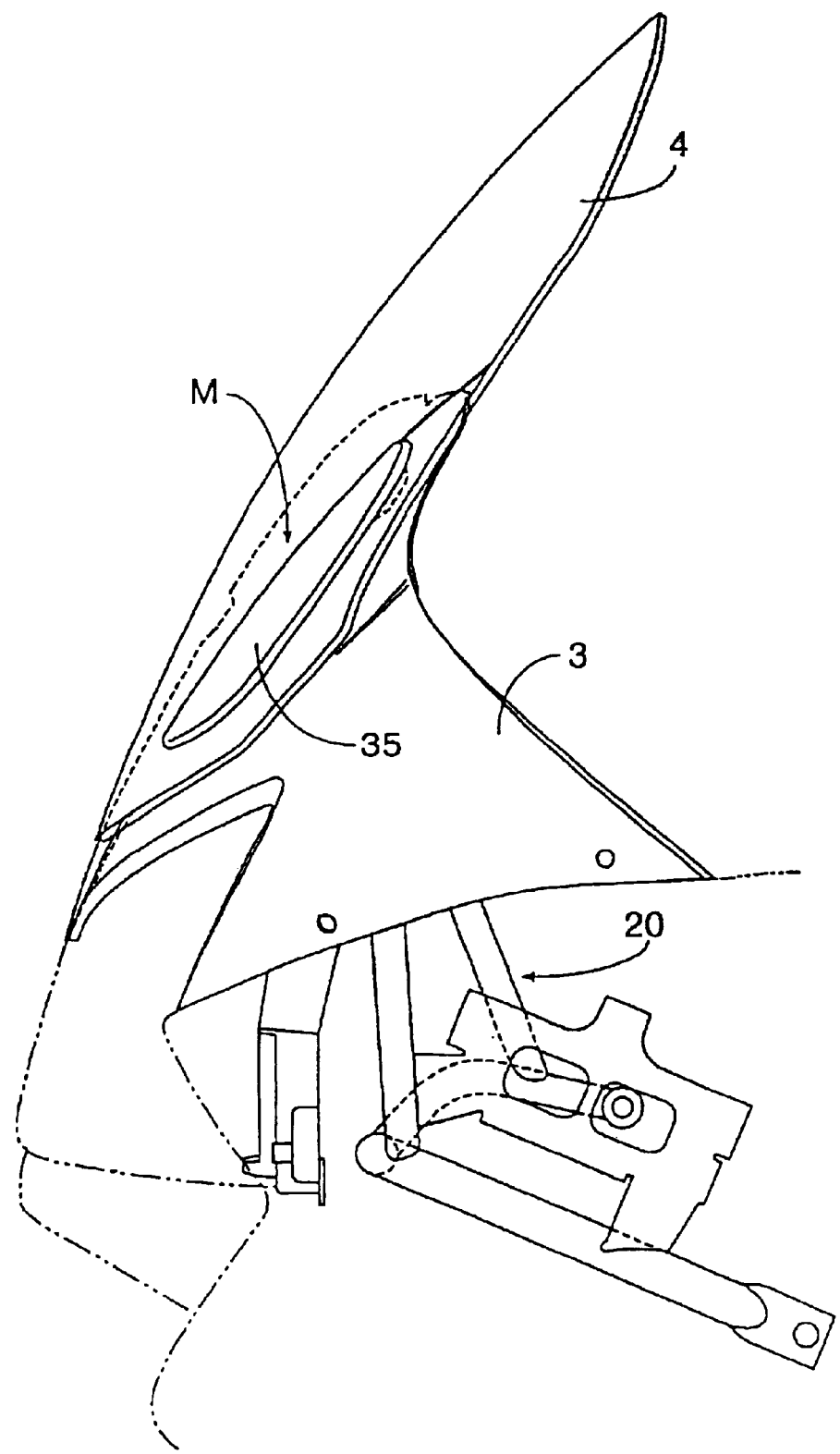
FIG. 5 is a side view showing a fourth embodiment of the present invention.
Figure 6:
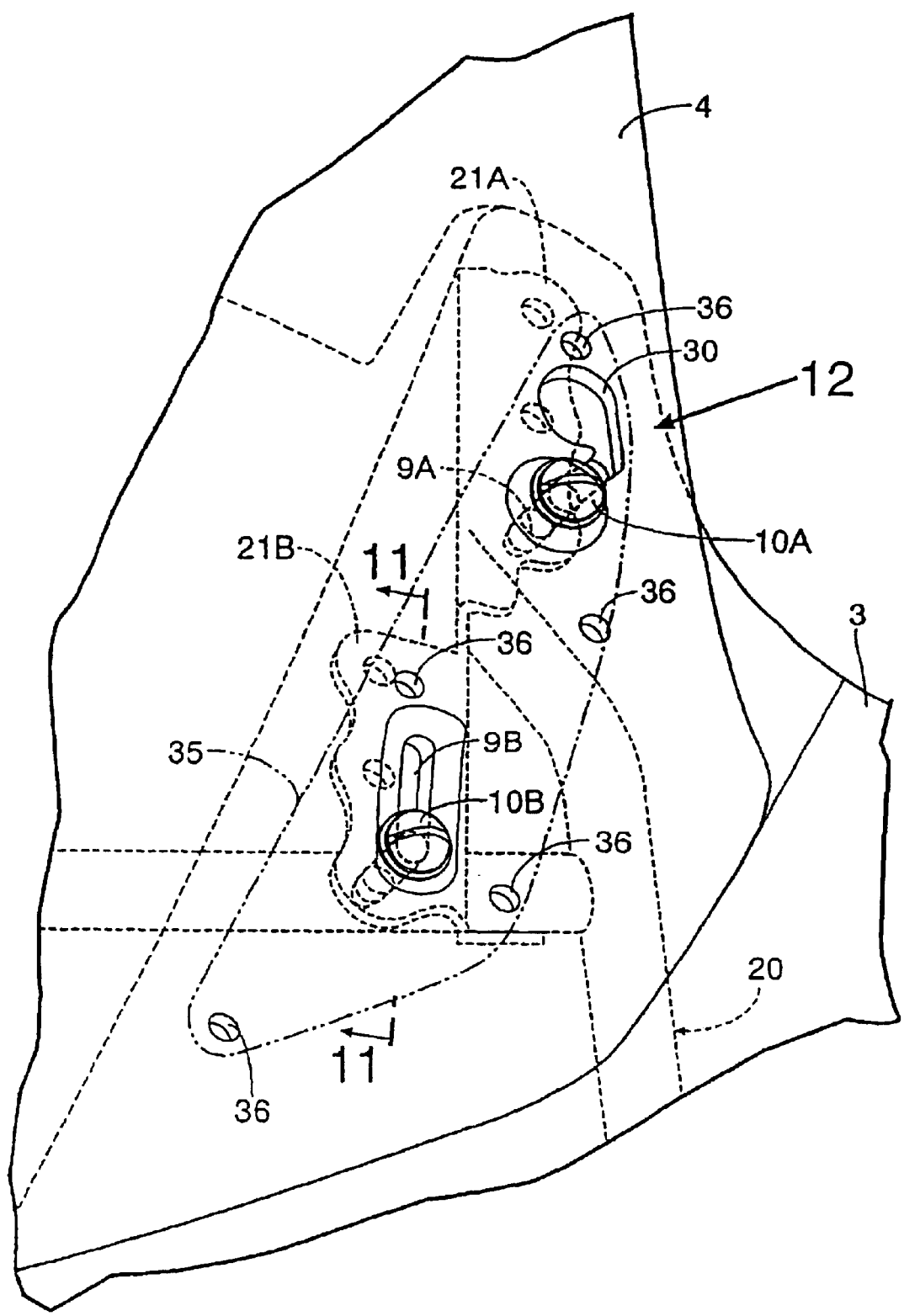
FIG. 6 is an enlarged front view of a principle portion of FIG. 5 in a state in which a cover has been disassembled.
Figure 7:
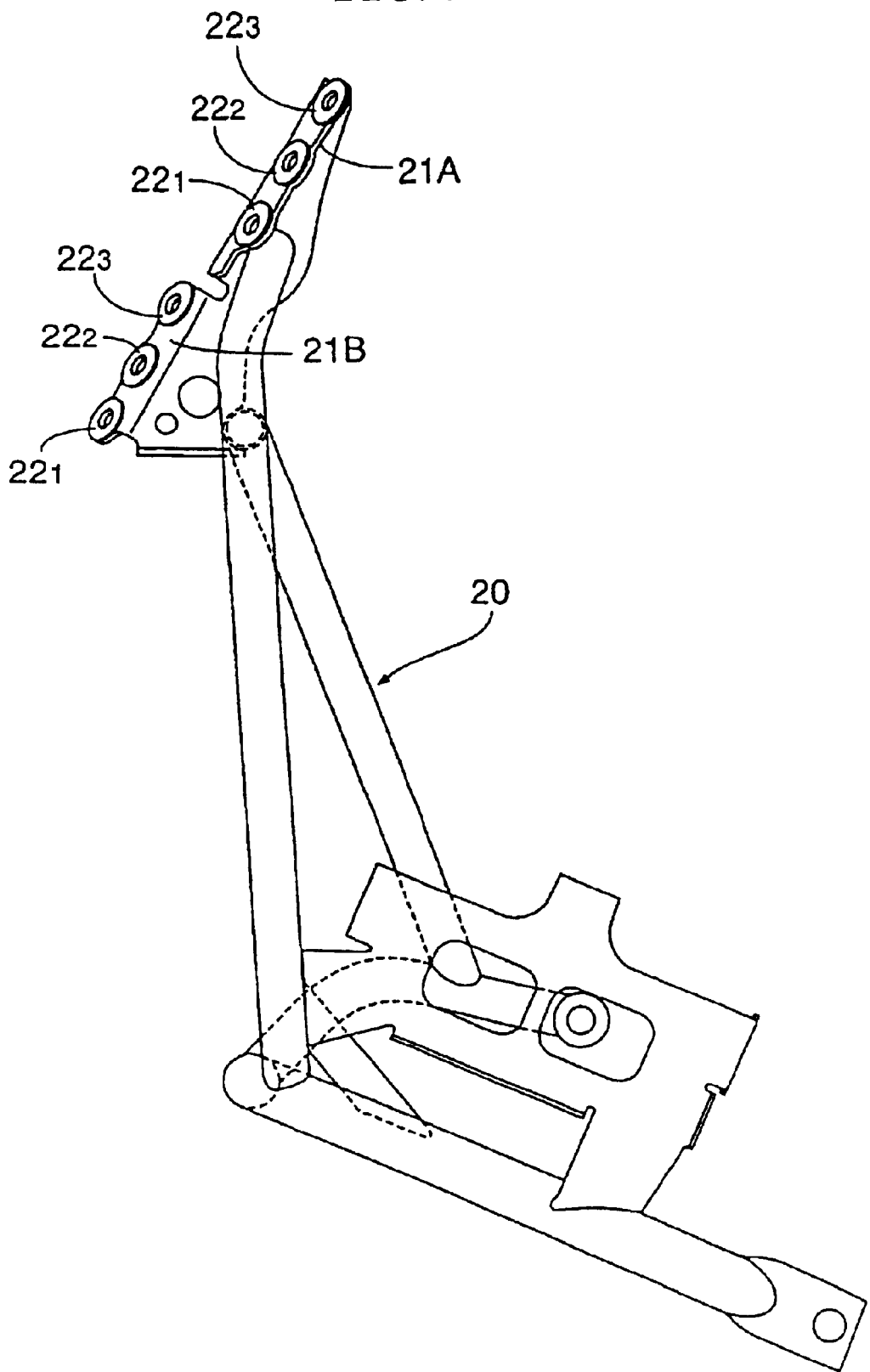
FIG. 7 is a side view of a mounting stay shown in FIG. 5.
Figure 8:
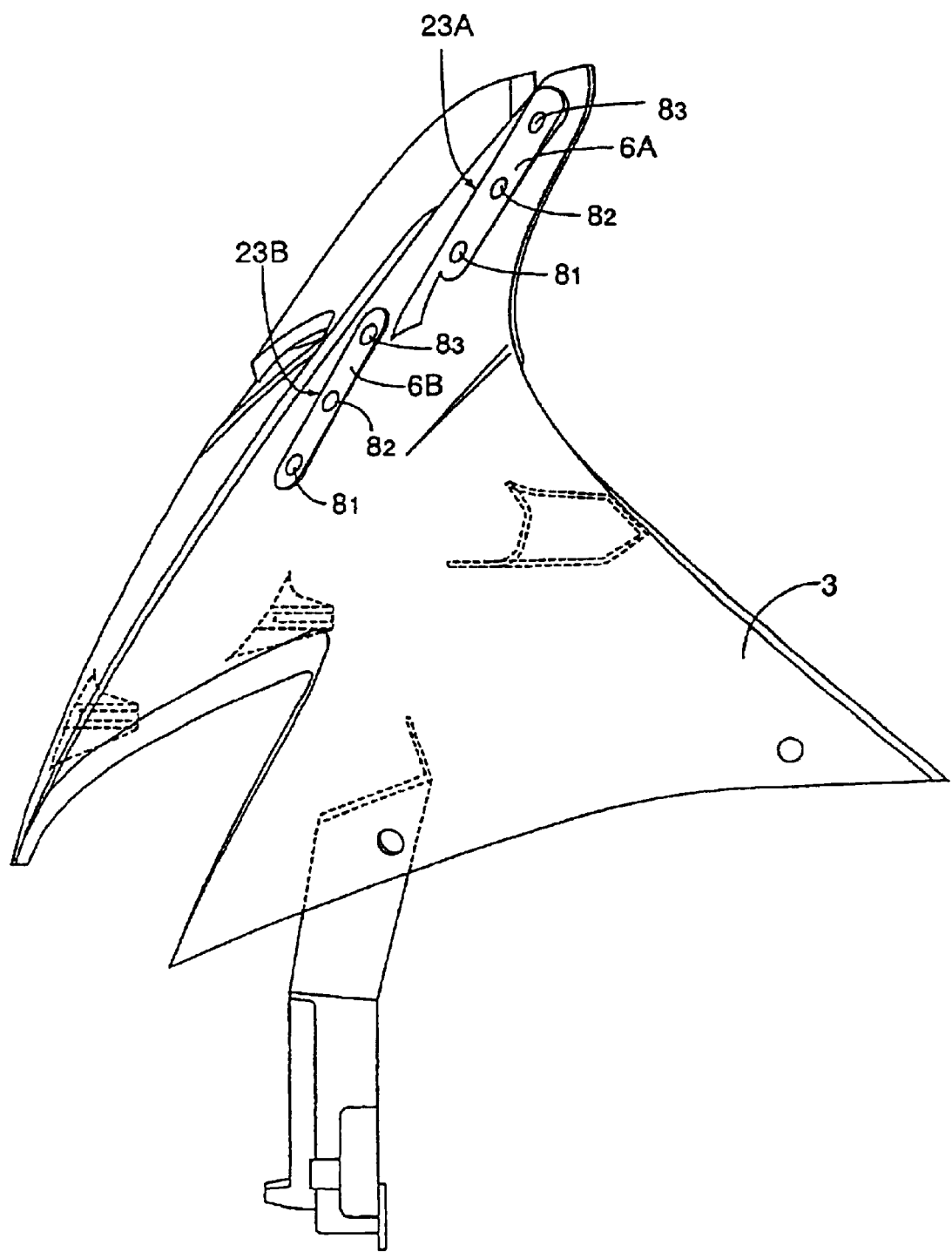
FIG. 8 is a side view of a front cowl shown in FIG. 5.
Figure 9:
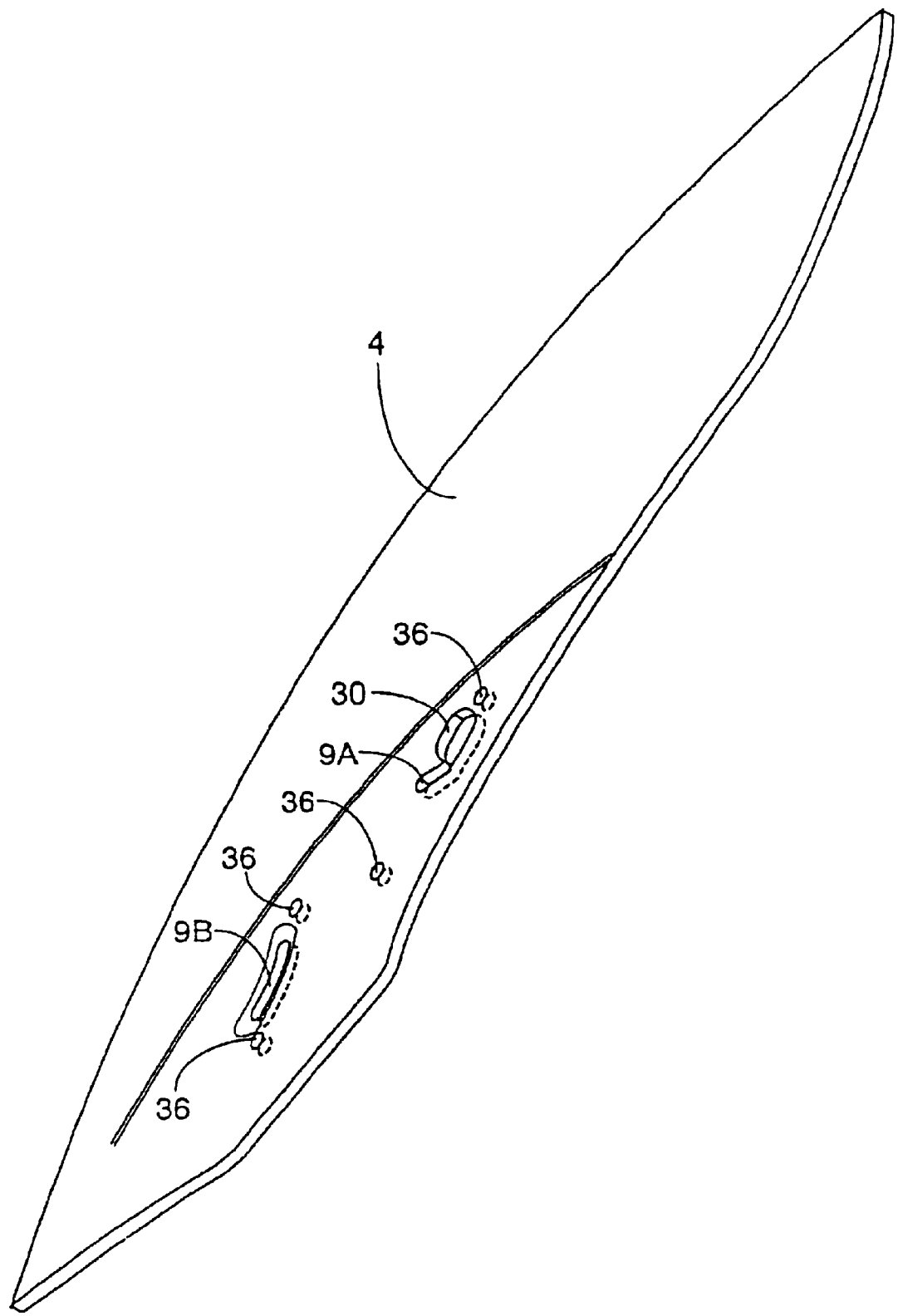
FIG. 9 is a side view of a windscreen shown in FIG. 5.
Figure 10:
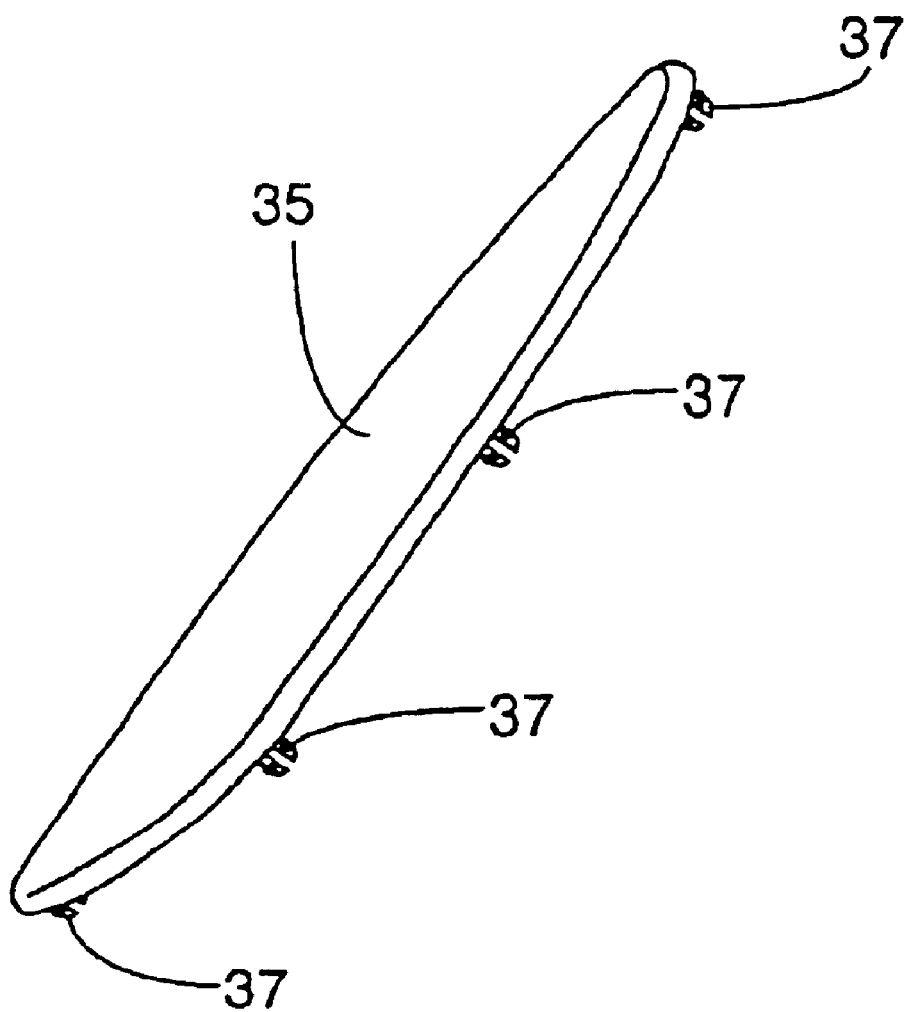
FIG. 10 is a side view of a cover shown in FIG. 5.
Figure 11:
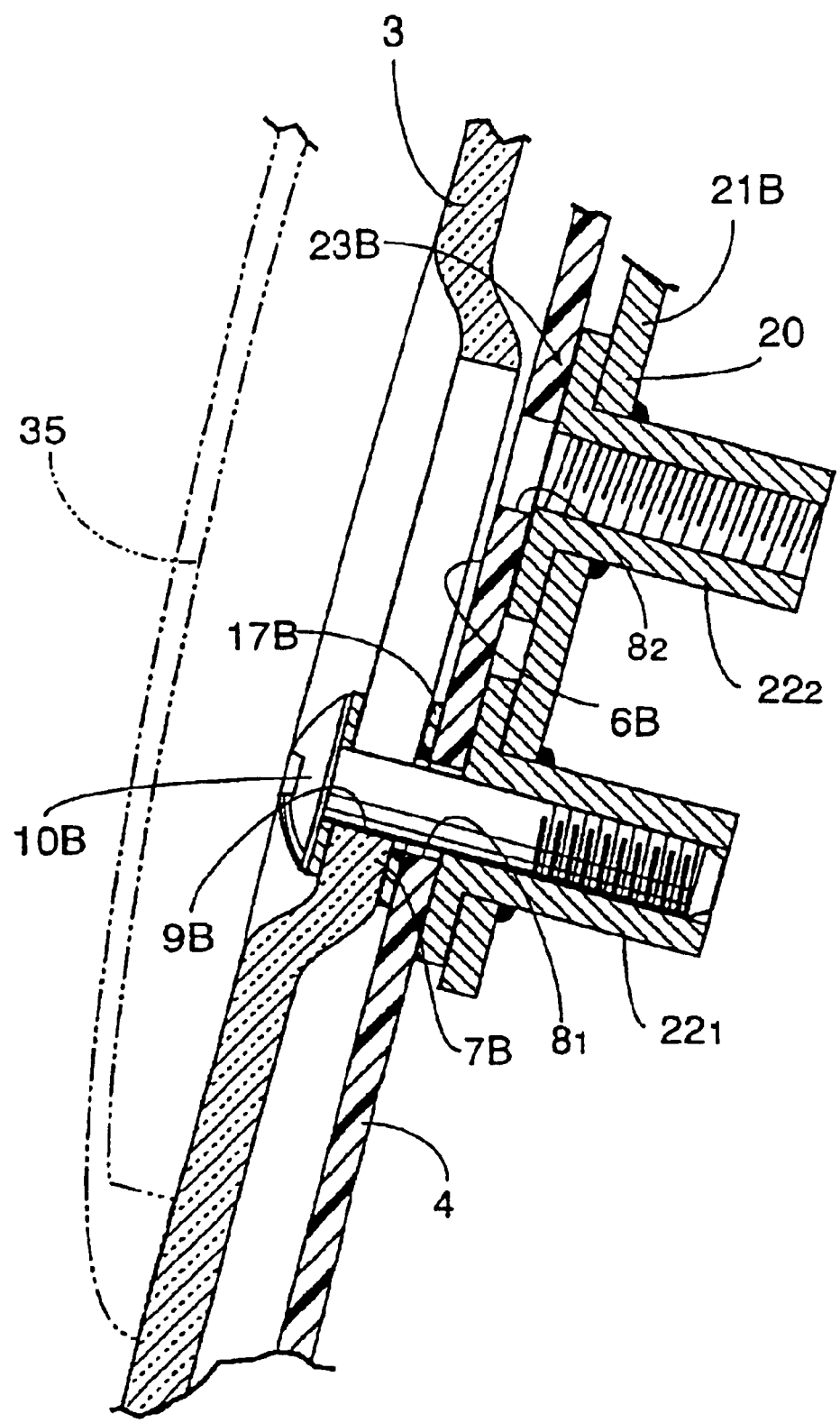
FIG. 11 is a cross-sectional view taken along the line 11—11 in FIG. 6.
Figure 12:
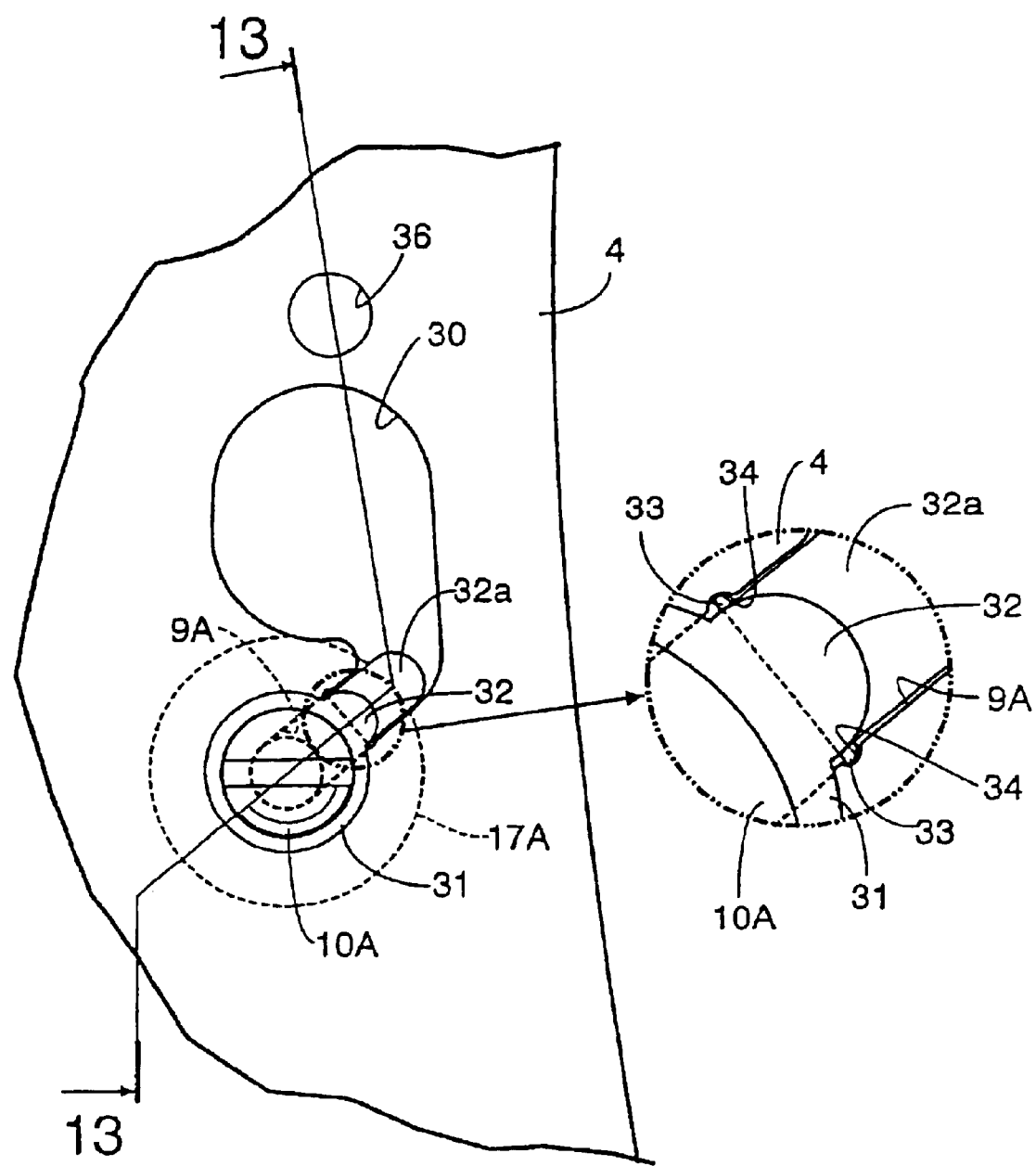
FIG. 12 is a partial side view taken along the direction indicated by the arrow 12 in FIG. 6.
Figure 13:
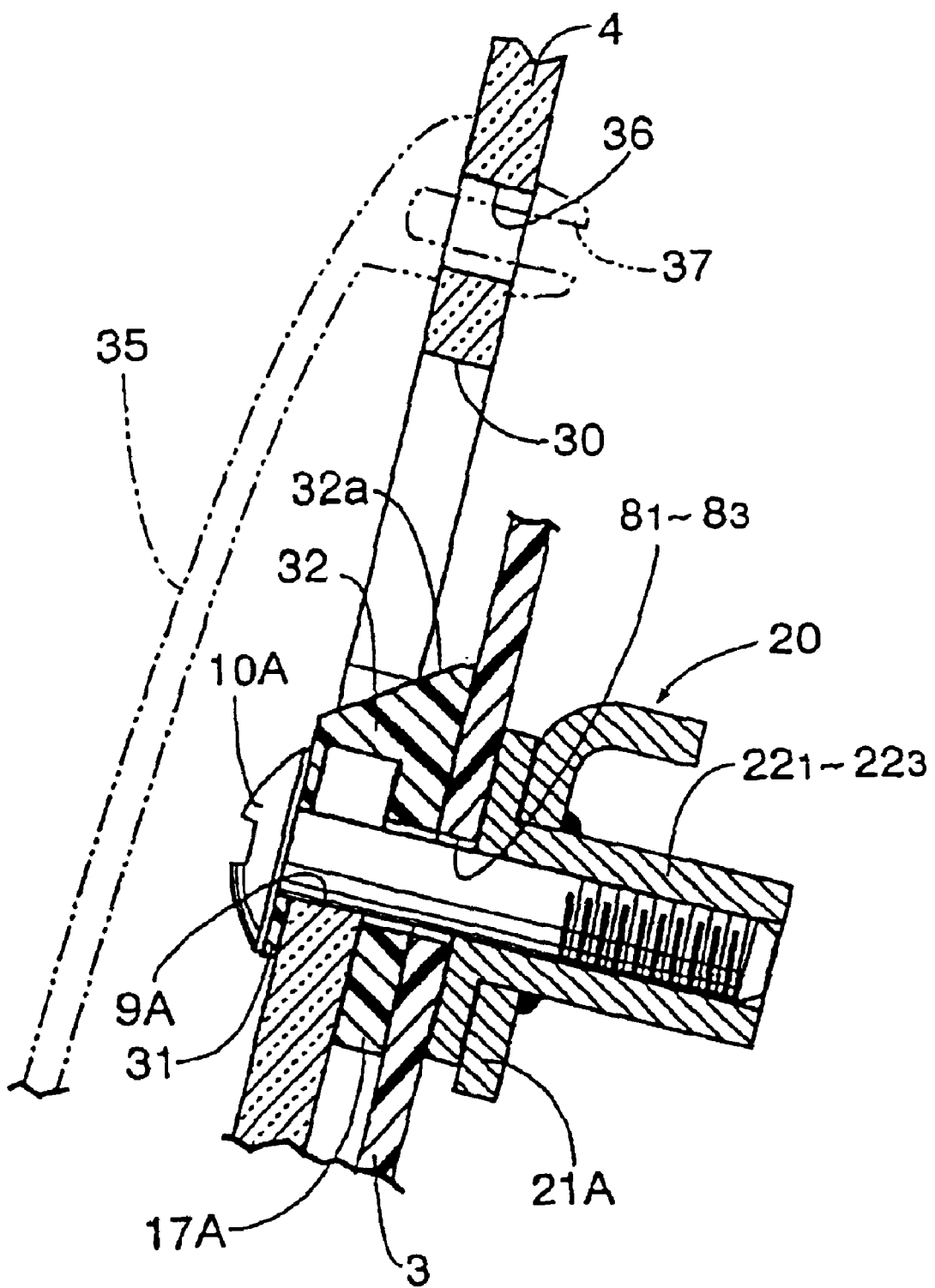
FIG. 13 is a cross-sectional view taken along the line 13—13 in FIG. 12.
Figure 14A:
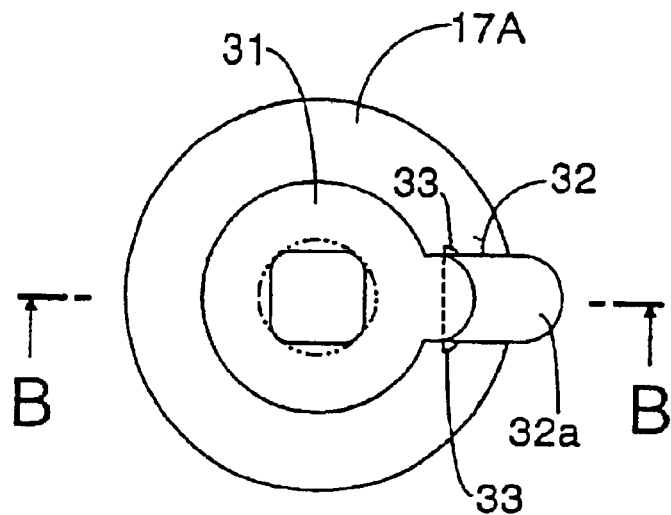
FIGS. 14(A)–(C) are side and sectional views of a spacer shown in FIG. 13.
Figure 14B:
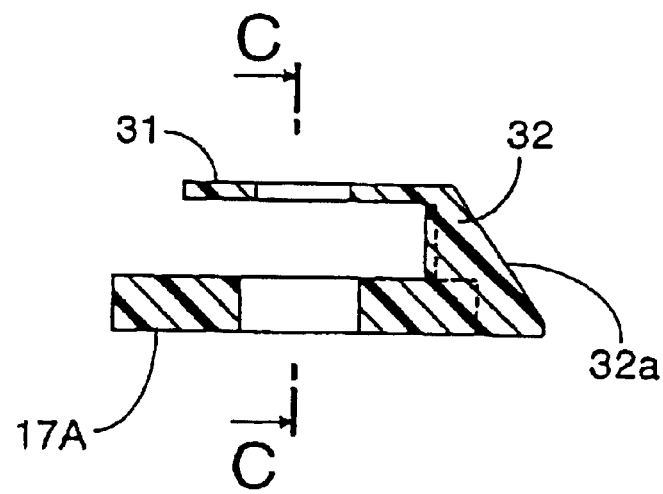
Figure 14C:
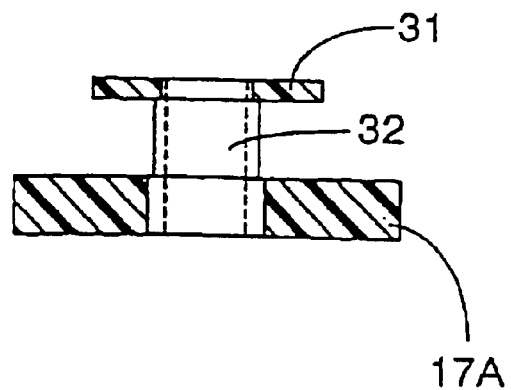
Figure 15:
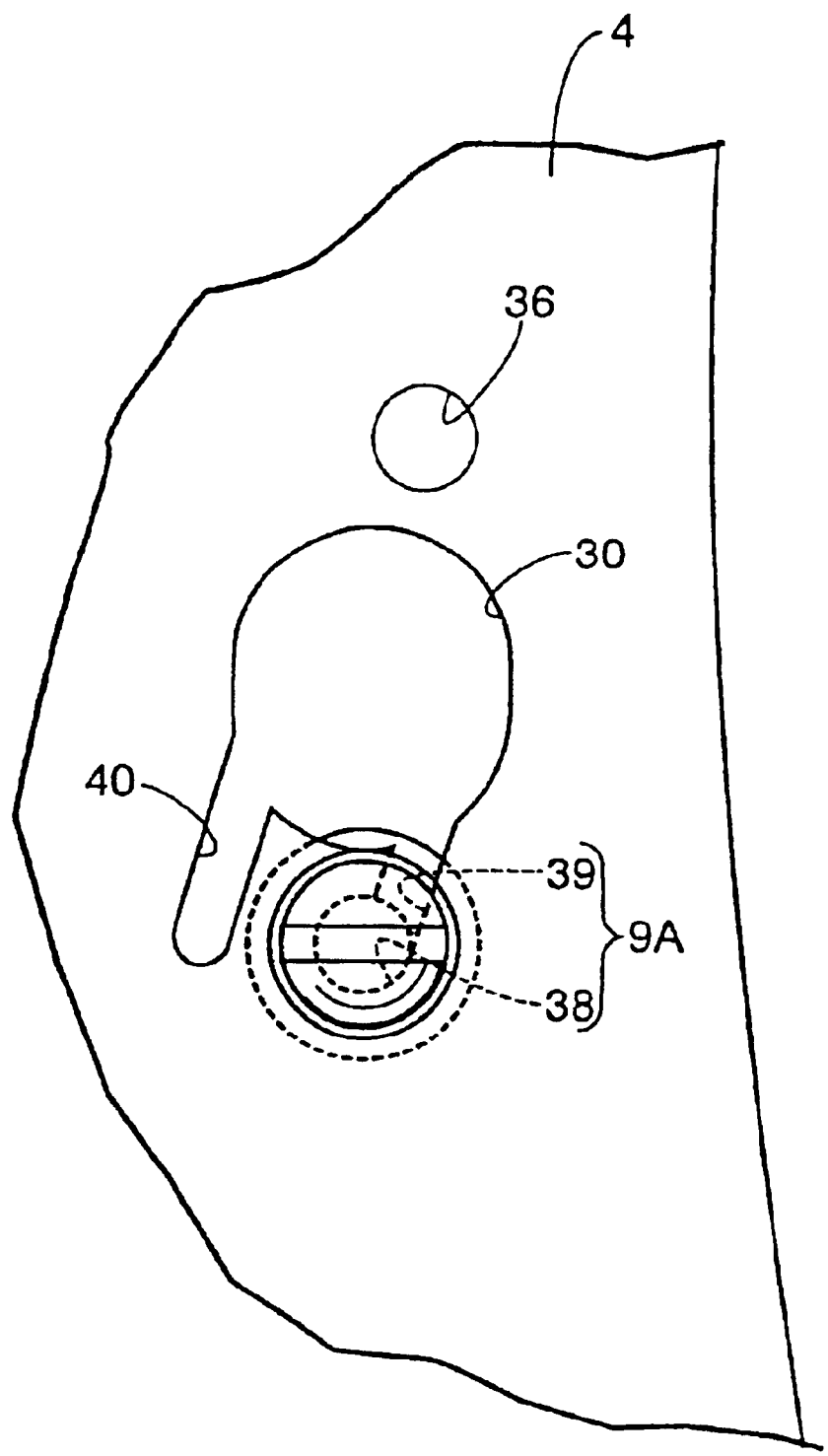
FIG. 15 is a partial side view corresponding to FIG. 12 and showing a fifth embodiment of the invention.

The present invention will hereinafter be described with reference to the accompanying drawings. FIG. 1 is a side view of a motorcycle provided with a windscreen mounting structure according to a first embodiment of the present invention. FIG. 2(A) is a vertical cross-sectional side view of the windscreen mounting structure showing the height of the windscreen set to a reference position. FIG. 2(B) is a vertical cross-sectional view of the windscreen mounting structure showing the height of the windscreen set to a higher position than the reference position. FIGS. 3(A) and 3(B) are vertical cross-sectional views corresponding to FIGS. 2(A) and 2(B), respectively, and showing a second embodiment of the present invention. FIGS. 4(A) and 4(B) are vertical cross-sectional views corresponding to FIGS. 2(A) and 2(B), respectively, and showing a third embodiment of the present invention. FIG. 5 is a side view showing a fourth embodiment of the present invention. FIG. 6 is an enlarged front view of a principle portion of FIG. 5 in a state in which a cover has been disassembled. FIG. 7 is a side view of a mounting stay shown in FIG. 5. FIG. 8 is a side view of a front cowl shown in FIG. 5. FIG. 9 is a side view of a windscreen shown in FIG. 5. FIG. 10 is a side view of a cover shown in FIG. 5. FIG. 11 is a cross-sectional view taken along the line 11—11 in FIG. 6. FIG. 12 is a partial side view taken along the direction indicated by the arrow 12 in FIG. 6. FIG. 13 is a cross-sectional view taken along the line 13—13 in FIG. 12. FIGS. 14(A)–(C) are side and sectional views of a spacer shown in FIG. 13. FIG. 15 is a partial side view corresponding to FIG. 12 and showing a fifth embodiment of the invention.

The first embodiment of the present invention shown in FIG. 1 and FIG. 2 will be described hereinafter. In FIG. 1, the front portion of a vehicle body 1 of a motorcycle is provided with a front cowl 3 formed of synthetic resin for covering the upper front surface of a front fork 2. The front cowl 3 is curved so as to project toward the front of the vehicle body 1 and is disposed so as to rise and extend toward the rear of the vehicle body 1. A transparent windscreen 4 formed of synthetic resin is attached to the front surface of the front cowl 3 so as to extend upwardly thereof according to a windscreen mounting structure M of the present invention. The windscreen 4 is curved so as to also project toward the front.

A pair of windscreen mounting structures M are mounted symmetrically on both of the left and the right sides of front cowl 3 and the windscreen 4. However, the following description will be provided for only one of the windscreen mounting structures hereinafter. The windscreen mounting structure M includes a mounting plane 6 (or plate) formed on the front surface of the front cowl 3 so as to rise upward toward the rear of the vehicle body and a pair of upper and lower bosses 7A, 7B extending upwardly and projecting from the backside of the windscreen 4 corresponding to the mounting plane 6. The bosses 7A, 7B are formed with mounting holes 9A, 9B, respectively. The front cowl 3 is formed with a plurality of adjusting holes 81–83 aligned in the vertical direction and opening on the mounting plane 6. The adjusting holes 81–83 are divided into first and second sets 11A, 11B (upper and lower, respectively) of adjusting holes aligned in the vertical direction corresponding to the pair of bosses 7A and 7B. The number of mounting holes 81–83 in one group is three in the example shown in the drawing. However, the number of holes can be varied as desired. The pair of bosses 7A, 7B are aligned with one of the plurality of adjusting holes 81–83 from each of the upper and the lower sets and secured to the front cowl 3 with bolts 10A, 10B inserted therethrough.

The operation of the first embodiment will be described in greater detail hereinafter. In the example shown in the drawings, the mounting plane 6 on the front cowl 3 is formed with two sets 11A, 11B of three adjusting holes 81–83 each including three adjusting holes. Therefore, the height of the windscreen 4 is adjustable in three levels by aligning and securing each boss 7A, 7B on the windscreen 4 to the corresponding one of three mounting holes 81–83 sequentially and securing the windscreen 4 to the front cowl 3 with bolts 10A, 10B.

When performing such adjustment, the bosses 7A, 7B of the windscreen 4 move linearly along the mounting plane 6 formed on the front surface of the front cowl 3 so as to rise toward the rear. For example, as is clear when comparing the reference position of the windscreen 4 in which the pair of bosses 7A, 7B are aligned with the lowermost adjusting holes 81, 81 of the respective sets as shown in FIG. 2(A) and the uppermost position of the windscreen 4 in which the pair of bosses 7A, 7B are aligned with the uppermost adjusting holes 83, 83 of the respective sets as shown in FIG. 2(B), the shift amount Y of the upper end of the windscreen 4 in the vertical direction is proportional to the shift amount X thereof in the fore-and-aft direction, and thus the shift amount does not tilt to one direction. As a consequence, even when the height of the windscreen 4 is adjusted according to meet the individual demands of the rider, the windscreen 4 can be constantly kept at a suitable angle and therefore exhibits preferable windproof performance for the rider.

Since the windscreen 4 is formed with the bosses 7A, 7B projected from the backside thereof, the opposing surfaces of the front cowl 3 and the windscreen 4 do not come into contact with each other except for the bosses 7A, 7B irrespective of their curved configurations described above. Accordingly, the interference between the front cowl 3 and the windscreen 4 that may occur when adjusting the height of the windscreen 4 is avoided. Furthermore, since the windscreen mounting structure M is simple and thus requires only a small number of components, the windscreen 4 can be provided at a low price and is relatively simple to handle.

According to the second embodiment of the present invention shown in FIG. 3, spacers 17A, 17B for passing the bolts 10A, 10B through are interposed between the mounting plane 6 of the front cowl 3 and the windscreen 4 instead of the bosses 7A, 7B in the first embodiment. Since other constructions are the same as the first embodiment, the parts corresponding to the first embodiment in FIG. 3 are represented by the same reference numerals and will not be described again hereinafter. According to the second embodiment, since the windscreen 4 does not include the bosses 7A, 7B as in the first embodiment, the shape thereof is even more simplified and thus it can be formed easily.

The third embodiment of the invention shown in FIG. 4 has the same construction as the first and the second embodiments except that a pair of upper and lower mounting planes 6A, 6B are formed on the front surface of the front cowl 3 so as to rise toward the rear in parallel with each other. The pairs 11A, 11B of adjusting holes 81–83 are formed on the respective mounting planes 6A, 6B, and the windscreen 4 is integrally formed with the boss 7B, as in the first embodiment, on the backside thereof at the position corresponding to one mounting plane 6B. A spacer 17A, as in the second embodiment, is interposed between the other mounting plane 6A and the portion of the backside of the windscreen 4 corresponding thereto. Therefore, the parts corresponding to the first and second embodiments in FIG. 4 are represented by the same reference numerals and will not be described again hereinafter.

The fourth embodiment of the invention shown in FIG. 5 to FIG. 14 will be described in greater detail hereinafter. The fourth embodiment corresponds to the third embodiment discussed hereinabove. In the fourth embodiment as well, the windscreen mounting structure M is disposed symmetrically on both of the left and the right sides of the front cowl 3 and the windscreen 4. Therefore, description will be made only for one of the mounting structures M.

In FIG. 5 to FIG. 8, the windscreen mounting structure M is provided with a mounting stay 20 for supporting the front cowl 3 and the windscreen 4. As shown in FIG. 7, the mounting stay 20 is provided with a pair of upper and lower mounting plates 21A, 21B formed so as to rise toward the rear in parallel with each other. The mounting plates 21A, 21B each include a set of vertically aligned nuts 221, 222, 223 (three in an example shown in the drawings—See FIG. 11 and FIG. 13), respectively welded thereon. The front cowl 3 is integrally formed with a pair of upper and lower mounting portions 23A, 23B as shown in FIG. 8 corresponding to the mounting plates 21A, 21B. The front surfaces of the plate-shaped mounting portions 23A, 23B correspond to the mounting planes 6A, 6B rising toward the rear. The mounting portions 23A, 23B are formed with the same number of adjusting holes 81–83 as screw holes of the welded nuts 221, 222, 223 on the mounting plates 21A, 21B so as to be aligned therewith.

As shown in FIG. 9, the windscreen 4 is formed with the pair of upper and lower mounting holes 9A, 9B corresponding to the mounting planes 6A, 6B. The lower mounting hole 9B is formed as a vertically elongated hole, and the periphery thereof rises toward the backside of the windscreen 4 to form the boss 7B formed integrally with the windscreen 4. The upper mounting hole 9A is formed as an elongated hole extending obliquely upward and outward from the left and right. The lower ends of the mounting holes 9A, 9B are adapted to selectively align with the pair of upper and lower sets of adjusting holes 81–83.

As shown in FIG. 11 and FIG. 12, the pair of upper and lower spacers 17A, 17B are aligned with the lower end of the mounting holes 9A, 9B and are interposed between the mounting planes 6A, 6B of the front cowl 3 and the backside of the windscreen 4 opposing thereto. Therefore, the front cowl 3 and the windscreen 4 are secured to the mounting plates 21A, 21B by inserting the pair of upper and lower bolts 10A, 10B into the lower ends of the mounting holes 9A, 9B, the spacers 17A, 17B, any one of the adjusting holes 81–83 open on the mounting planes 6A, 6B in sequence, and screwing into the corresponding welded nuts 221, 222, 223, respectively.

By changing the holes to insert the bolts 10A, 10B among the plurality of adjusting holes 81–83 opening respectively on the upper and lower mounting planes 6A, 6B of the front cowl 3, the height of the windscreen 4 can be adjusted as in the case of the embodiments described above. In addition, since the spaces 17A, 17B move along the mounting planes 6A, 6B of the front cowl 3 when adjusting the height, the shift amount Y of the upper end of the windscreen 4 in the vertical direction is proportional to the shift amount X thereof in the fore-and-aft direction as in the case of the embodiments described above, the windscreen 4 can be constantly kept at a suitable angle and exhibits preferable windproof performance for the rider. Furthermore, since the spacers 17A, 17B and the boss 7B are present, the interference between the front cowl 3 and the windscreen 4 at the portion other than the spacers 17A, 17B and the boss 7B may be avoided.

In FIG. 12 to FIG. 14, the windscreen 4 is provided with a large hole 30 having a diameter larger than a head of the bolt 10A continuing from the upper end of the upper mounting hole 9A. The upper spacer 17A is integrally formed with a washer 31 to be interposed between the head of the bolt 10A and the windscreen 4, and a connecting member 32 for connecting one side of the washer 31 and of the spacer 17A with each other. The connecting member 32 fits into an elongated mounting hole 24A together with the shank of the bolt 10A, and is formed on both sides thereof with positioning projections 33, 33, which engage positioning recesses 34, 34 formed on the opposing inner surface of the mounting hole 24A. The outer end surface of the connecting member 32 is formed into a bevel 32a approaching the center of the washer 31 as the distance to the washer 31 reduces.

Therefore, when a downward impact exceeding a predetermined value is exerted on the windscreen 4, the windscreen 4 can attenuate the impact by being deformed while shifting downward against the fastening forces of the upper and the lower bolts 10A, 10B. In other words, the vertically elongated hole, which corresponds to the lower mounting hole 9B of the windscreen 4, accommodates the downward movement of the windscreen 4 by moving downward with respect to the lower bolt 10B, and the vertically and laterally inclined elongated hole, which corresponds to the upper mounting hole 9A, accommodates the downward movement of the windscreen 4 while deforming the same by moving downward with respect to the upper bolt 10A. When the upper bolt 10A moves from the mounting hole 9A to the large hole 30, and the inner peripheral edge of the large hole 30 is brought into strong abutment with the bevel 32a of the connecting member 32 of the spacer 17A, the windscreen 4 is bent forward along the bevel 32a. Therefore, the head of the upper bolt 10A comes off the large hole 30, and thus the windscreen 4 can easily be bent toward the front.

In FIG. 5, FIG. 6, FIG. 12, and FIG. 13, a synthetic resin cover 35 for covering the mounting holes 9A, 9B and the heads of the bolts 10A, 10B is detachably secured to the windscreen 4 with a plurality of engaging holes 36, 36 formed on the windscreen around the mounting holes 9A, 9B. The cover 35 is integrally formed with a plurality of engaging claws 37, 37, which resiliently engage the engaging holes 36, 36 on the inner surface thereof.

According to the fifth embodiment shown in FIG. 15, the upper mounting hole 9A on the windscreen 4 includes a round hole 38 to which the shank of the bolt 10A is fitted, and a slit 39 for communicating the round hole 38 with the large hole 30. The windscreen 4 is also formed with another slit 40 extending from the large hole 30 in parallel with the slit 39. Since the remaining elements are similar to the fourth embodiment, the parts in FIG. 15 corresponding to the fourth embodiment are represented by the same reference numerals and will not be described again hereinafter.

Since the portion of the windscreen 4 sandwiched by the slits 39, 40 is relatively easy to deform, when a downward impact exceeding a predetermined value is exerted on the windscreen 4, the shank of the bolt 10A can move toward the large hole 30 while opening the slit 39.

As described above, according to a first characteristic of the invention, the windscreen extending upwardly from the front cowl is secured to the mounting plane with bolts so as to be capable of adjustment in the vertical direction. Therefore, when adjusting the height of the windscreen, the windscreen is moved linearly along the mounting plane on the front surface of the front cowl so as to be inclined upward toward the rear. The shift amount of the upper end of the windscreen in the vertical direction is proportional to the shift amount thereof in the fore-and-aft direction, and thus the shift amount does not tilt toward one of these directions. Consequently, the windscreen is constantly maintained at a suitable angle of inclination so that preferable windproof performance is achieved. In addition, since this windscreen mounting structure M is simple and requires only a small number of components, the windscreen can be provided at a low price and is easily adjusted by a rider.

According to a second characteristic of the invention, the windscreen is integrally formed with a boss on the backside thereof being abutted against the mounting plane and bolted thereto. Since the windscreen includes the boss projecting from the backside thereof, the opposing surfaces of the front cowl and the windscreen do not come into contact with each other except for the boss portion irrespective of their curved configurations, whereby the interference between the front cowl and the windscreen that may occur when adjusting the height of the windscreen is avoided.

According to a third characteristic of the invention, the spacer to be bolted to the mounting plane together with the windscreen is provided between the backside of the widescreen and the mounting plane. Therefore, the opposing surfaces of the front cowl and the windscreen do not come into contact with each other irrespective of their curved configurations, and the interference between the front cowl and the windscreen that may occur when adjusting the height of the windscreen is avoided. In addition, since the shape the windscreen is simplified, it can be formed easily.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle comprising:
   a vehicle body having a front side and a rear side, and a front cowl at the front side of the vehicle body, wherein said front cowl is curved so as to project toward the front side and is mounted in a position extending toward the rear side of the vehicle body;
   a pair of mounting surfaces formed on a front surface of the front cowl, said mounting surfaces being inclined upward and toward the rear side of the vehicle body;
   a windscreen extending upwardly from the front cowl and being secured to each of the mounting surfaces with a bolt so as to be capable of adjustment with respect to a vertical direction of the vehicle body; and
   a mounting stay provided with the pair of mounting surfaces, wherein said mounting surfaces each include a set of vertically aligned nuts respectively welded thereon and the front cowl is integrally formed with a pair of upper and lower mounting portions corresponding to the mounting surfaces.

2. The motorcycle according to claim 1, wherein front surfaces of the mounting surfaces extend toward the rear side of the vehicle body.

3. The windscreen mounting structure according to claim 1, wherein the windscreen is integrally formed with a pair of bosses on a rear side of the windscreen for respectively abutting against the mounting surfaces.

4. The windscreen mounting structure according to claim 3, wherein the bosses are bolted to the mounting surfaces.

5. The windscreen mounting structure according to claim 1, further comprising a pair of spacers being bolted to the respective mounting surfaces and the windscreen, wherein the spacers are provided in positions between a rear side of the windscreen and the mounting surfaces.

6. The windscreen mounting structure according to claim 3, further comprising a pair of spacers being bolted to the respective mounting surfaces and the windscreen, wherein the spacers are provided in positions between the rear side of the windscreen and the mounting surfaces.

7. A windscreen mounting structure for a motorcycle, said windscreen mounting structure comprising:
   a front cowl for mounting at a front side of a vehicle body, wherein said front cowl is curved so as to project toward a front side of the cowl and extends toward a rear side of the cowl;
   a pair of mounting surfaces formed on a front surface of the front cowl, said mounting surfaces being inclined upward and extending toward a rear side of the front cowl;
   a windscreen extending upwardly from the front cowl and being secured to each of the mounting surfaces with a bolt so as to be capable of adjustment with respect to a vertical direction of the front cowl and the windscreen; and
   a mounting stay provided with the pair of mounting plates, wherein said mounting surfaces each include a set of vertically aligned nuts respectively welded thereon and the front cowl is integrally formed with a pair of upper and lower mounting portions corresponding to the mounting surfaces.

8. The windscreen mounting structure according to claim 7, wherein front surfaces of the mounting surfaces extend toward the rear side of the vehicle body.

9. A windscreen mounting structure for a motorcycle, said windscreen mounting structure comprising:
   a front cowl for mounting at a front side of a vehicle body, wherein said front cowl is curved so as to project toward a front side of the cowl and extends toward a rear side of the cowl;
   a pair of mounting surfaces formed on a front surface of the front cowl, said mounting surfaces being inclined upward and extending toward a rear side of the front cowl;

a windscreen extending upwardly from the front cowl and being secured to each of the mounting surfaces with a bolt so as to be capable of adjustment with respect to a vertical direction of the front cowl and the windscreen; and a mounting stay provided with the pair of mounting surfaces, wherein said mounting surfaces each include a set of vertically-aligned threaded portions formed integrally with the mounting surfaces and the front cowl is formed integrally with a pair of upper and lower mounting portions corresponding to the vertically-aligned threaded portions of the mounting surfaces.

* * * * *